UNITED STATES PATENT OFFICE.

JOSEPH G. WEYER, OF PROVIDENCE, RHODE ISLAND.

COMPOSITION FOR MOLDS.

No. 816,833.    Specification of Letters Patent.    Patented April 3, 1906.

Application filed December 2, 1904. Serial No. 235,258.

*To all whom it may concern:*

Be it known that I, JOSEPH G. WEYER, a resident of the city of Providence, in the county of Providence and State of Rhode Island, have invented certain new and useful Improvements in Composition for Molds; and I do hereby declare that the following is a full, clear, and exact description thereof.

This invention relates to compositions for molds for casting purposes, and has for its object the production of a mold by means of which the most delicate outlines and designs may be reproduced from the pattern and brought out in the casting. A mold for this purpose must be constructed in such a manner as to stand the heat necessary for drying it and also the heat of the melted metals poured into it without cracking or crumbling. At the same time the mold must be porous enough to admit a free escape of the gases usually generated by fluid metals.

My invention consists, essentially, of a mold composed of plaster-of-paris and finely-screened coal-ashes mixed together in given proportions.

In forming my mold I first mix plaster-of-paris with water to about the consistency of a thick creamy substance. Then the finely-sifted ashes are mixed with water to about the same consistency, and these two substances are then mixed together in about equal proportions, one-half of the plaster-of-paris and one-half of the ashes, and well stirred to form a uniform mass. The material is then poured around the pattern, forming a mold in two halves in substantially the same manner as plaster molds are formed, first one-half of the mold being made and then the other. When I have formed my molds, as stated, I place them in a drying-oven and expose them to a moderate heat—say 250° to 300° Fahrenheit—for about four or five hours, more or less, so as to evaporate the greater portion of the moisture and render the molds practically dry.

By the use of ashes mixed with plaster I produce a mold that is very porous as compared with molds formed entirely of plaster or of plaster mixed with asbestos or other fibrous material. A mold constructed of plaster and ashes in the proportions named on account of its porous qualities need not be heated to so high a degree in order to evaporate the moisture and render it dry preparatory to receiving the molten metal. This composition also forms a mold into which I can pour the metal the same as in a dry-sand mold. Another advantage is my mold dries quicker and not requiring to be heated so hot it cools quicker. Therefore several hours are saved in preparing these molds over the time taken to prepare one of plaster alone or plaster and asbestos combined. Another advantage gained from my improved mold is that on account of its porous nature brass may be poured into it and perfect castings obtained therefrom. As is well known by those skilled in the art of molding, brass requires a very porous mold to carry off the excessive amount of gases generated therefrom while in a molten state. Then, again, the expense of the material in my mold is reduced to a minimum, as both plaster-of-paris and coal-ashes are very inexpensive, especially the coal-ashes, which is a waste product. A long practical experience in molding has established the fact that a mold constructed in the manner above described will produce the finest castings that is possible to take from a mold, and this result may be produced by simply pouring into this mold the same as in a dry-sand mold and positively does not require mechanical pressure in order to produce good castings. In fact, some of the castings I have taken from my molds have been so thin and sharp and perfect in every detail that they have been pronounced by experts to be equal to those that have been struck up by a die.

In my mold properly constructed of the required ingredients of plaster-of-paris and ashes I can cast metals that melt as low as 600° or 700° Fahrenheit—such as zinc, britannia, and the like—or I can cast equally as well the harder metals that melt at from 1,000° to 2,000°, such as gold, silver, brass, and the like.

The material of my molds is of sufficient strength to permit the use of elastic-rubber patterns having many deep and fine undercuts in their designs. The elastic patterns can be drawn from a mold made of my composition without breaking away the deep undercuts in the design. Molds made of my composition of plaster-of-paris and ashes can be used for casting metals in them with most satisfactory results, either by pressure applied to the fluid metal to force it into the molds or by means of simply pouring the metal into the mold, as is done ordinarily in using sand or loam molds.

In order to give an idea of the novelty and utility of my invention, I may state that it has been the aim of founders and artisans to use molds made of plaster for casting metals, especially brass, bronze, German and sterling silver, gold, &c., because the most delicate outlines and design of a given pattern can be more accurately and sharply reproduced in a plaster mold than in a mold of sand or loam. Metals melting at a low degree of heat are cast in pure plaster molds. Such metals as type metal, tin, britannia, and zinc have been cast in plaster molds with success; but the metal has to be forced into the molds by mechanical pressure. Sterling silver and some low-melting brass compositions have been cast in plaster molds by pressure; but the results with these metals were never satisfactory or practical, even though cast under pressure. The molds could not withstand the heat necessary to dry them perfectly and effectually. Consequently, they cracked when the red-hot metal was injected. They also became soft, and the pressure on the metal caused it to penetrate into the mold, producing a rough casting and obliterating all fine outlines and design; but by the use of my mixture of plaster-of-paris and ashes as specified I produce an extremely strong mold with a very fine smooth face, and one which will withstand the heat and reproduce practically as fine a casting as a mold made out of plaster alone. The combination of the ashes mixed with the plaster in the required proportions gives to it all of the necessary qualifications for withstanding the heat and carrying off the gases to produce the finest quality of castings.

Having thus described my invention, what I claim as new, and desire to secure by Letters Patent, is—

A mold to receive metal castings composed of a mixture of equal quantities of plaster-of-paris and finely-sifted coal-ashes.

In testimony whereof I have hereunto set my hand this 1st day of December, A. D. 1904.

JOSEPH G. WEYER.

In presence of—
  HOWARD E. BARLOW,
  E. I. OGDEN.